United States Patent
Kang et al.

(10) Patent No.: US 6,377,539 B1
(45) Date of Patent: Apr. 23, 2002

(54) METHOD FOR GENERATING QUASI-ORTHOGONAL CODE AND SPREADER USING THE SAME IN MOBILE COMMUNICATION SYSTEM

(75) Inventors: Hee-Woon Kang; Jae-Yoel Kim; Jae-Min Ahn; Young-Ky Kim, all of Seoul; Jong-Seon No, Songnam-shi; Ha-Bong Chung, Kwachon-shi; Kyeong-Cheol Yang, Seoul, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/149,924

(22) Filed: Sep. 9, 1998

(30) Foreign Application Priority Data

Sep. 9, 1997 (KR) .............................................. 97-46402

(51) Int. Cl.[7] .............................................. H04J 11/00
(52) U.S. Cl. ........................ 370/209; 370/203; 375/130
(58) Field of Search ................................. 370/209, 203, 370/204, 208, 320, 335, 479, 342, 441; 375/130, 135, 140, 142, 146, 150, 137

(56) References Cited

U.S. PATENT DOCUMENTS

| | | | | |
|---|---|---|---|---|
| 3,715,508 A | * | 2/1973 | Blasbalg | 370/203 |
| 5,088,111 A | * | 2/1992 | McNamara et al. | 375/290 |
| 5,546,423 A | * | 8/1996 | Sehier et al. | 375/141 |
| 5,583,851 A | * | 12/1996 | Kato et al. | 370/342 |
| 5,623,487 A | * | 4/1997 | Natali | 370/342 |
| 5,799,010 A | * | 8/1998 | Lomp et al. | 370/335 |
| 5,864,548 A | * | 1/1999 | Liu | 370/320 |
| 5,987,014 A | * | 11/1999 | Magill et al. | 370/335 |
| 6,144,694 A | * | 11/2000 | Uta et al. | 375/146 |

* cited by examiner

*Primary Examiner*—Dang Ton
*Assistant Examiner*—Brian Nguyen
(74) *Attorney, Agent, or Firm*—Dilworth & Barrese, LLP

(57) ABSTRACT

A device for generating quasi-orthogonal codes which allow the minimum interference with orthogonal codes in a mobile communication system using the orthogonal codes. The device includes a first spreader for spreading at least one input signal with quasi-orthogonal codes, a second spreader for spreading another input signal with Walsh codes, and a PN (Pseudo-Noise) spreader for complex-spreading output signals of the first and second spreaders with PN sequences. The quasi-orthogonal codes are characterized in that a partial correlation value with the Walsh codes does not exceed a lowest partial correlation limit value.

25 Claims, 9 Drawing Sheets

$$Q = \begin{bmatrix} 0 & 0 & 0 & 0 & 0 & 0 & \cdots & 0 & 0 \\ 0 & S_0(t) \\ 0 & S_0(t+1) \\ 0 & S_0(t+2) \\ \vdots & \vdots \\ 0 & S_0(t+2^{2m}-2) \\ 0 & S_1(t) \\ 0 & S_1(t+1) \\ \vdots & \vdots \\ 0 & S_1(t+2^{2m}-2) \\ 0 & S_2(t) \\ 0 & S_2(t+1) \\ \vdots & \vdots \\ 0 & S_{2^m-1}(t) \\ 0 & S_{2^m-1}(t+1) \\ \vdots & \vdots \\ 0 & S_{2^m-1}(t+2^{2m}-2) \end{bmatrix}$$

FIG. 3

$$Q' = \begin{bmatrix} \overbrace{W}^{2^{2m}} \\ e_0 + W \\ e_1 + W \\ \vdots \\ e_{2^m-1} + W \end{bmatrix} \Bigg\} 2^m * 2^{2m}$$

FIG. 4

METHOD FOR GENERATING QUASI-ORTHOGONAL CODE AND SPREADER USING THE SAME IN MOBILE COMMUNICATION SYSTEM

BACKGROUND OF THE INVENTION

1. Technical Field

The present invention relates generally to a mobile communication system and, in particular, to a method for generating quasi-orthogonal codes and spreader using the same in a mobile communication system.

2. Description of the Related Art

In general, a CDMA (Code Division Multiple Access) system separates the channels by using orthogonal codes in order to increase channel capacity. For example, a forward link specified by the IS-95/IS-95A standard separates the channels by using the orthogonal codes. This channel separation method can also be applied to an IS-95/IS-95A reverse link through time alignment.

FIG. 1 illustrates the IS-95/IS-95A forward link in which the channels are separated by orthogonal codes. Referring to FIG. 1, the channels are separated by allocated orthogonal codes Wi (where i=0–63), respectively, which typically are Walsh codes. The IS-95/IS-95A forward link uses convolutional codes with a code rate R=1/2, employs a BPSK (Bi-Phase Shift Keying) modulation, and has a bandwidth of 1.2288 MHz. Accordingly, the number of available channels is 1.2288 MHz/(9.6 KHz*2)=64 (i.e., the IS-95/IS-95A forward link can separate 64 channels by using the orthogonal codes).

By selecting a modulation method and detecting the minimum data rate, the number of available orthogonal codes can be determined. However, designers of CDMA system(s) continuously strive to provide an increase in the number of the channels in order to improve the capability. However, even when a CDMA system uses the increased number of channels, the number of the available orthogonal codes are limited. In particular, increasing the channel capacity is restricted due to the limited number of the available orthogonal codes. In a mobile communication system using a variable data rate, the length of the Walsh codes depends upon the variable data rate. Thus, it is desirable to generate quasi-orthogonal codes allowing the minimum interference with the length of the Walsh codes.

SUMMARY OF THE INVENTION

It is therefore an object of the present invention to provide a device and method for generating quasi-orthogonal codes in a mobile communication system using orthogonal codes so as to increase the channel capacity, and provide minimum interference with the orthogonal codes.

It is another object of the present invention to provide a device and method for spreading a signal by using Walsh codes and quasi-orthogonal codes in a CDMA mobile communication system.

It is a further object of the present invention to provide a device and method for generating quasi-orthogonal codes which allow the minimum interference with Walsh codes of varied lengths due to the variable data rate in a mobile communication system using both the Walsh codes and the quasi-orthogonal codes.

According to one aspect of the present invention, a channel transmission device for a CDMA mobile communication system includes a first spreader for spreading at least one input signal with quasi-orthogonal codes, a second spreader for spreading another input signal with Walsh codes, and a PN (Pseudo-Noise) spreader for complex-spreading output signals of the first and second spreaders with PN sequences. The quasi-orthogonal codes are characterized in that a partial correlation value with the Walsh codes does not exceed a lowest partial correlation limit value.

According to another aspect of the present invention, a method for generating quasi-orthogonal codes of length $2^{2m}$ in a mobile communication system using Walsh codes and the quasi-orthogonal codes includes the steps of generating an m-sequence of length $2^{2m}$ and selecting sub-sequences having a period of $2^{2m-1}$ by selecting elements at intervals of $2^{m+1}$; generating non-zero sub-sequences out of the selected sub-sequences; generating $2^{m-1}$ sequences by connecting the sub-sequences, and column-permuting the generated sequences by a column permutation function; adding Walsh codes to the column-permuted sequences to generate quasi-orthogonal candidate sequences having a full correlation value between the Walsh codes and other quasi-orthogonal codes that is smaller than a lowest full correlation limit value; and selecting, from the quasi-orthogonal candidate sequences, quasi-orthogonal codes having a partial correlation value with the Walsh codes that satisfies a minimum partial correlation value at a variable data rate.

BRIEF DESCRIPTION OF THE DRAWINGS

The above objects and advantages of the present invention will become more apparent by describing in detail preferred embodiments thereof with reference to the attached drawings in which:

FIG. 3 is a diagram showing a structure of a matrix Q according to a first is embodiment of the present invention;

FIG. 4 is a diagram showing a structure of a matrix Q' according to a second embodiment of the present invention;

DETAILED DESCRIPTION OF PREFERRED EMBODIMENTS

Figure 1:
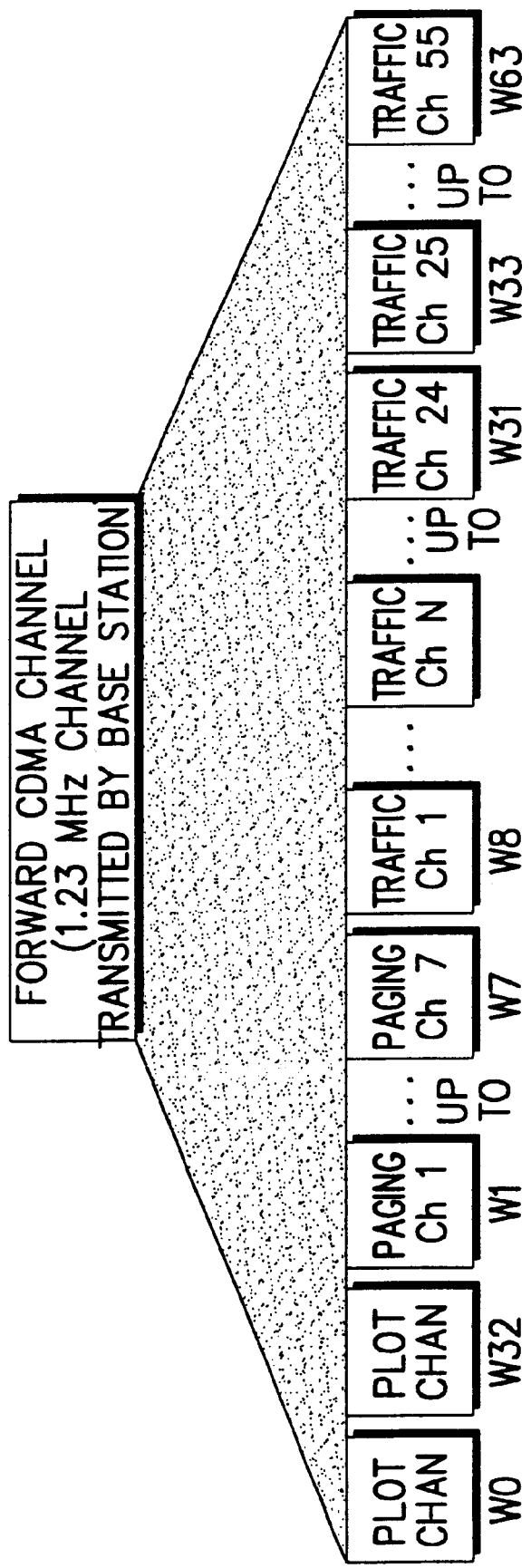
FIG. 1 is a diagram which illustrates channel separation by using orthogonal codes.

The present invention is directed to a method for generating quasi-orthogonal codes which allow the minimum interference with the orthogonal codes in a CDMA system using the orthogonal codes, so as to increase the channel capacity of the system and the capacity of a single cell.

The quasi-orthogonal codes of the present invention should satisfy the following conditions expressed by Equations (1) to (3).

$$\left| \sum_{t=1}^{N} (-1)^{S_i(t)+W_k(t)} \right| \leq \theta_{N\min} \quad \langle \text{Condition 1} \rangle \quad (1)$$

$$\left| \sum_{t=1}^{N} (-1)^{S_i(t)+S_i'(t)} \right| \leq \theta_{N\min} \quad \langle \text{Condition 2} \rangle \quad (2)$$

$$\left| \sum_{t=1+(\frac{N}{M}l)}^{\frac{N}{M}(l+1)} (-1)^{S_i(t)+W_k(t)} \right| \leq \theta_{\frac{N}{M}\min} \quad \langle \text{Condition 3} \rangle \quad (3)$$

where, l=0,1,2, . . . , M−1;

$W_k(t)$ represents a k-th orthogonal code of length N ($1 \leq k \leq N$); and $S_i(t)$ represents a quasi-orthogonal code of length N ($1 \leq i \leq X$) where X is a quasi-orthogonal code number satisfying the conditions provided by Equations (1) to (3).

The first condition of Equation (1) provides that a full correlation between an i-th orthogonal code $W_k(t)$ ($1 \leq k \leq N$, $1 \leq t \leq N$) and an i-th quasi-orthogonal code $S_i(t)$ ($1 \leq k \leq X$, $1 \leq t \leq N$) should not exceed $\theta_{Nmin}$. Specifically, when taking the correlation between the Walsh codes of length N and the quasi-orthogonal codes of length N, the full correlation therebetween should be smaller than the lowest fall correlation limit $\theta_{Nmim}$. The second condition of Equation (2) provides that the full correlation between an i-th line and an i'-th line of the quasi-orthogonal code should not exceed $\theta_{Nmin}$. Specifically, when taking the correlation between different Walsh codes of length N, the full correlation therebetween should be smaller than the lowest full correlation limit value $\theta_{Nmim}$. The third condition of Equation (3) provides that when using the quasi-orthogonal codes of length N and the Walsh codes of length N/M, the partial correlation between the respective codes of length N/M should not exceed $$\theta_{\frac{N}{M}\min}.$$

M is a value obtained by dividing the full length of the Walsh codes by the length of the Walsh codes whose length is changed by the variable data rate. For example, when using the Walsh codes of N=64 at a data rate of 9.6 Kbps, if the data rate is changed to 19.2 Kbps, the length of the Walsh codes becomes N/M=32. In this case, M is 2. When the data rate is changed as above, if the length N of the Walsh codes is changed and the length of the quasi-orthogonal codes is maintained, the partial correlation value between the Walsh codes having the changed length and the quasi-orthogonal codes having the constant length should be smaller than the lowest partial correlation limit value $$\theta_{\frac{N}{M}\min}.$$

This is to use a part of the sequence length of the quasi-orthogonal codes for correlation, when Walsh code length is varied. In this case, the quasi-orthogonal codes should have a lower correlation with the Walsh codes having the varied length.

Figure 2:
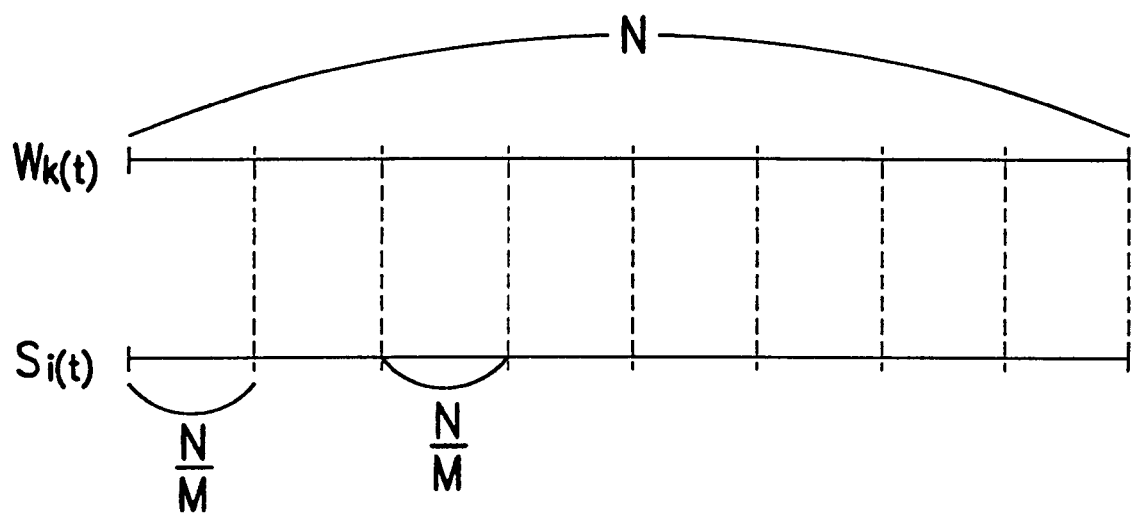
FIG. 2 is a diagram which illustrates a partial correlation between a Walsh as code and a quasi-orthogonal code.

The above Equation (1) shows the full correlation property between the orthogonal codes and the quasi-orthogonal codes, and $\theta_{Nmim}$ is a value satisfying a covering radius of a first Reed-Muller code of length N and represents a value having the minimum correlation property theoretically. Further, Equation (2) shows the condition of the full correlation property between the quasi-orthogonal codes. In addition, Equation (3) shows the partial correlation property between the orthogonal codes and the quasi-orthogonal codes. The partial correlation property of Equation (3) is shown in FIG. 2, wherein $M = 2^a (0 \leq a \leq \log_2 N)$. The partial correlation satisfies a condition that if the data rate is increased during the data service, the input signal is spread with Walsh codes of length N/M and then transmitted. Equation (3) shows a condition satisfying this correlation property. For example, when N=256, the values $$\theta_{\frac{N}{M}\min}$$

are shown in the following Table 1.

TABLE 1

| N = 256 | M = 1 | $\theta_{\frac{N}{M}\min} = 16$ |
|---|---|---|
| N = 256 | M = 2 | $\theta_{\frac{N}{M}\min} = 16$ |
| N = 256 | M = 4 | $\theta_{\frac{N}{M}\min} = 8$ |
| N = 256 | M = 8 | $\theta_{\frac{N}{M}\min} = 8$ |
| N = 256 | M = 16 | $\theta_{\frac{N}{M}\min} = 4$ |
| N = 256 | M = 32 | $\theta_{\frac{N}{M}\min} = 4$ |
| N = 256 | M = 64 | $\theta_{\frac{N}{M}\min} = 2$ |

The results of Table 1 can be expanded in general. For example, when N=1024 and a=2 (M=4), for the partial correlation between an orthogonal code of length 1024 and an orthogonal code of length 256, a full correlation bound $\theta_{Nmim}$ between an orthogonal code of length 256 and a sequence other than the orthogonal code should be considered. Table 2 below shows the relationship between the length N and the lowest correlation limit value $\theta_{Nmim}$.

TABLE 2

| N = 2048 | $\theta_{Nmim} = 64$ |
|---|---|
| N = 1024 | $\theta_{Nmim} = 32$ |
| N = 512 | $\theta_{Nmim} = 32$ |
| N = 256 | $\theta_{Nmim} = 16$ |
| N = 128 | $\theta_{Nmim} = 16$ |
| N = 64 | $\theta_{Nmim} = 8$ |
| N = 32 | $\theta_{Nmim} = 8$ |

Research has shown that Kasami sequences can be utilized to satisfy the above conditions (1) and (2). In particular, a kasami sequence family exhibits a good cross correlation property between the Kasami sequences in a specified Kasami sequence group and the full correlation property of the Kasami sequence family is well known in the art. In contrast, research has not heretofore been conducted to provide a sequence satisfying the above condition (3). However, it is very important for the IS-95B standard or the future CDMA system supporting the variable data rate to satisfy condition (3).

First, among the sequences of length $2^{2m}$, there exists $2_m$ Kasami sequences satisfying conditions (1) and (2), including an m-sequence itself. A Kasami sequence set K is represented by the following Equation (4).

$$K=[S_O(t), S_1(t), \ldots, S_{2^m-1}(t)] \quad (4)$$

where $t=0, \ldots, 2^{2m}-2$, and $S_O(t)$ is the m-sequence.

Referring now to FIG. 3, matrix Q can be constructed by cyclically shifting the sequences of the Kasami sequence set K of Equation (4). The matrix Q has $2^m * 2^{2m}$ rows and $2^{2m}$ columns. Here, it is known that Walsh codes can be made from a first $2^{2m}$ row by the column permutation. In this manner, orthogonal codes of length $2^{2m}$ and $(2^m-1)*2^{2m}$ sequences satisfying conditions (1) and (2) above can be obtained.

Next, the sequences satisfying condition (3) are selected from $(2^m-1)*2^{2m}$ sequences. It is necessary to group the orthogonal sequences out of the selected sequences. Although the original matrix Q is grouped in this way, it is ungrouped after the column permutation. As illustrated in FIG. 4, however, it is possible to obtain a matrix Q' formed by regrouping the orthogonal codes. As shown, the matrix Q' includes $2^m$ orthogonal groups.

Figure 5:
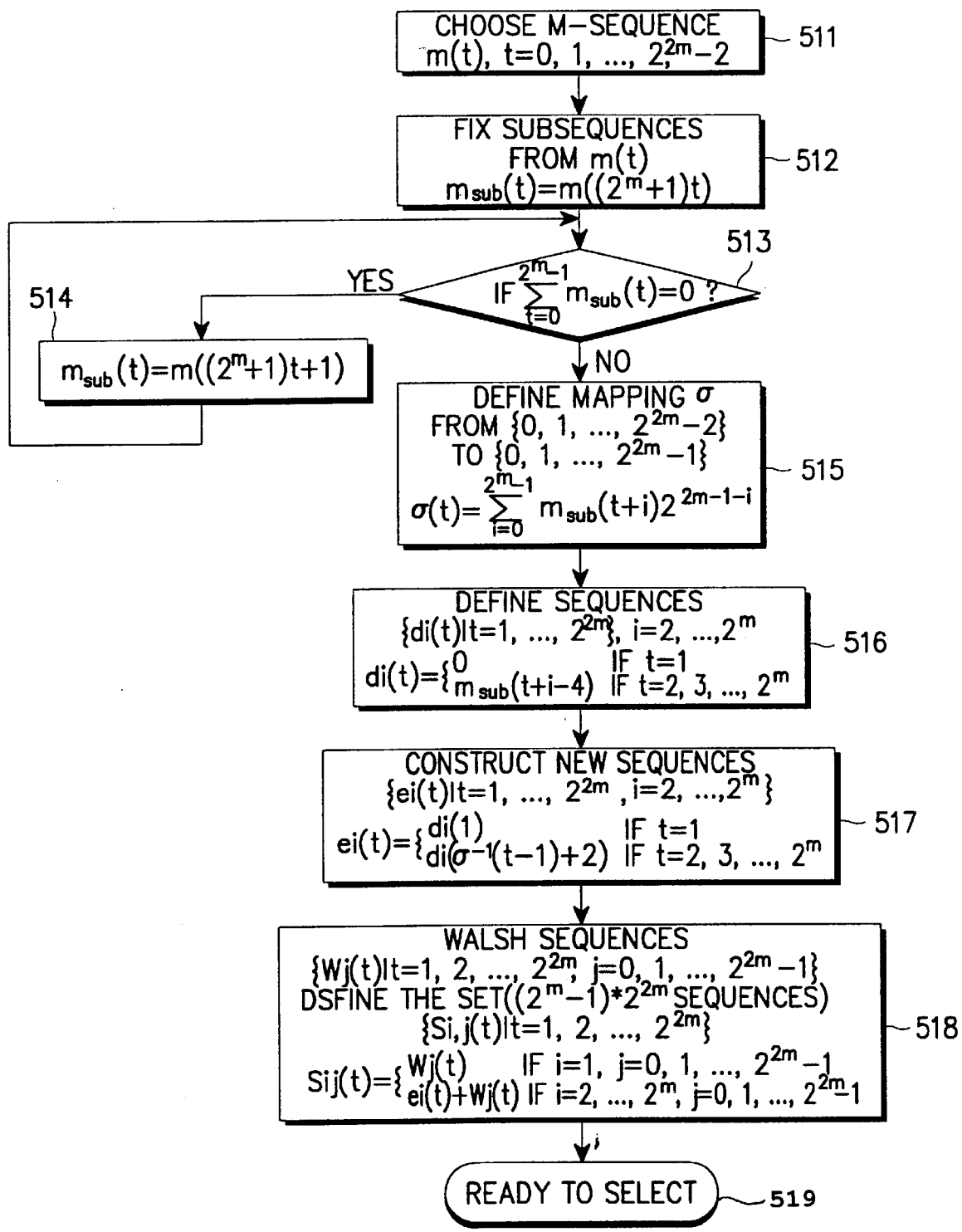
FIG. 5 is a flowchart which illustrates a method for generating quasi-orthogonal codes in accordance with one aspect of the present invention.

Referring now to FIG. 5, a flowchart illustrates a method for generating quasi-orthogonal candidate sequences of length $2^{2m}$. Initially, an m-sequence m(t) of length $2^{2m}-1$ (where $t=0,1, \ldots, 2^{2m}-2$) is chosen (step 511). Next, sub-sequences having a period of $2^m-1$ are generated (step 512) by extracting (fixing) elements from the m-sequence m(t) (chosen in step 511) at intervals of $(2^m+1)$. Next, a determination is made as to whether the sum of the sub-sequences (fixed in step 512) is zero or not $$\left[\sum_{t=0}^{2^m-1} m_{sub}(t) = 0\right]$$

(step 513). If the sum of the sub-sequences is zero (affirmative result at step 513), the non-zero sub-sequences $[m_{sub}(t)=m((2^m+1)t+1)]$ are generated (step 514).

When the sum of the sub-sequences is determined to be non-zero (negative result at step 513), a function for column-permuting the column-shifted Kasami sequence is defined (step 515). Specifically, a mapping σ from $\{0,1, \ldots, 2^{2m}-2\}$ to $$\{1, 2, \ldots, 2^{2m}-1\} \mid \sigma(t) = \sum_{t=0}^{2^m-1} m(t+i)2^{2m-1-i}$$

is defined.

Thereafter, the sub-sequences (generated in the step 512) are column-shifted to make $2^{2m}-1$ sequences (step 516), which means generation of the full sequences by connecting the sub-sequences. As a result, as shown in FIG. 5, the sequences are defined as:

$$[d_i(t)|t=1, \ldots, 2^{2m}, i=2, \ldots, 2^m]$$

$$d_i(t) = \begin{bmatrix} 0, & \text{if } t = 1 \\ m_{sub}(t+i-4), & \text{if } t = 2, 3, \ldots 2^{2m} \end{bmatrix}$$

The sequences (defined in step 516) are column-permuted (step 517) by the permutation function (defined in step 515), so as to construct new sequences. Here, the amount of new sequences that can be constructed is as many as the number of the sub-sequences. That is, the new sequences (in step 517) are represented as follows;

$$[e_i(t)|t=1, \ldots, 2^{2m}, i=2, \ldots, 2^m]$$

$$e_i(t) = \begin{bmatrix} d_i(1), & \text{if } t = 1 \\ d_i(\sigma^{-1}(t-1)+2), & \text{if } t = 2, 3, \ldots 2^{2m} \end{bmatrix}$$

Next, the quasi-orthogonal codes are enumerated (step 518) as shown in FIG. 4 by using the $e_i(t)$'s defined above. That is, the quasi-orthogonal candidate sequences are generated by adding the column-permuted values to the Walsh codes, and the above quasi-orthogonal candidate sequences satisfy the conditions of Equations (1) and (2). The operation of step 518 can be expressed by;

$$[W_j(t)|t=1,2, \ldots 2^{2m}, j=0,1, \ldots, 2^{2m}-1]$$

$$[S_{ij}(t)|t=1,2, \ldots 2^{2m}]$$

$$S_{ij}(t) = \begin{bmatrix} W_j(t), & \text{if } i = 1, & j = 0, 1, \ldots 2^{2m}-1 \\ e_i(t) + W_j(t), & \text{if } i = 2, \ldots 2^m, & j = 0, 1, \ldots, 2^{2m}-1 \end{bmatrix}$$

After generation of the quasi-orthogonal candidate sequences satisfying Equations (1) and (2), the procedure is ready to select the quasi-orthogonal codes satisfying the condition of the above Equation (3) (step 519). Accordingly, the quasi-orthogonal codes satisfying the condition of Equation (3) are selected from the quasi-orthogonal candidate sequences through experiments. Here, the $e_i(t)$ selected in accordance with the method described above for FIG. 5 is called a mask.

The quasi-orthogonal codes generated by the above procedure are shown below in Tables 3A and 3B. Table 3A shows the quasi-orthogonal codes of length 128 and Table 3B shows the quasi-orthogonal codes of length 256. In the following to tables 3A and 3B, g(x) represents coefficients of a characteristic polynomial used for generating m-sequence.

TABLE 3A

| g(x) = 1100111 |
|---|
| f1 = 17dbbd71e8db427117dbbd71e8db4271 |
| f2 = 72824ebebeb17d7272824ebebeb17d72 |
| f3 = 2dee87bb8744d2ee2dee87bb8744d2ee |

TABLE 3B g(x) = 101001101 f1 = 77b4b477774bb48887bb447878bbbb7877b44b88774b4b777844447887744bb78
f2 = 7e4ddbe817244d7ed41871bd428e18d4d4e77142bd8ee7d47eb2db17e824b27e
f3 = 417214d87db1281beb274172d7e47db1b17de4d78dbed8141b28b17d27eb8dbe
f4 = 144ee441b114bee44eebbee4144e1bbe8d287d27d78dd87dd78d278272d77d27
f5 = 488b78471dded1edb88474b7edd1de1d122ede1d477b74b71dde2e12488b84b8
f6 = 1db78bded17b47121d488b212e7bb8122e7b472d1d4874ded17bb8ed1db77421

Figure 6:
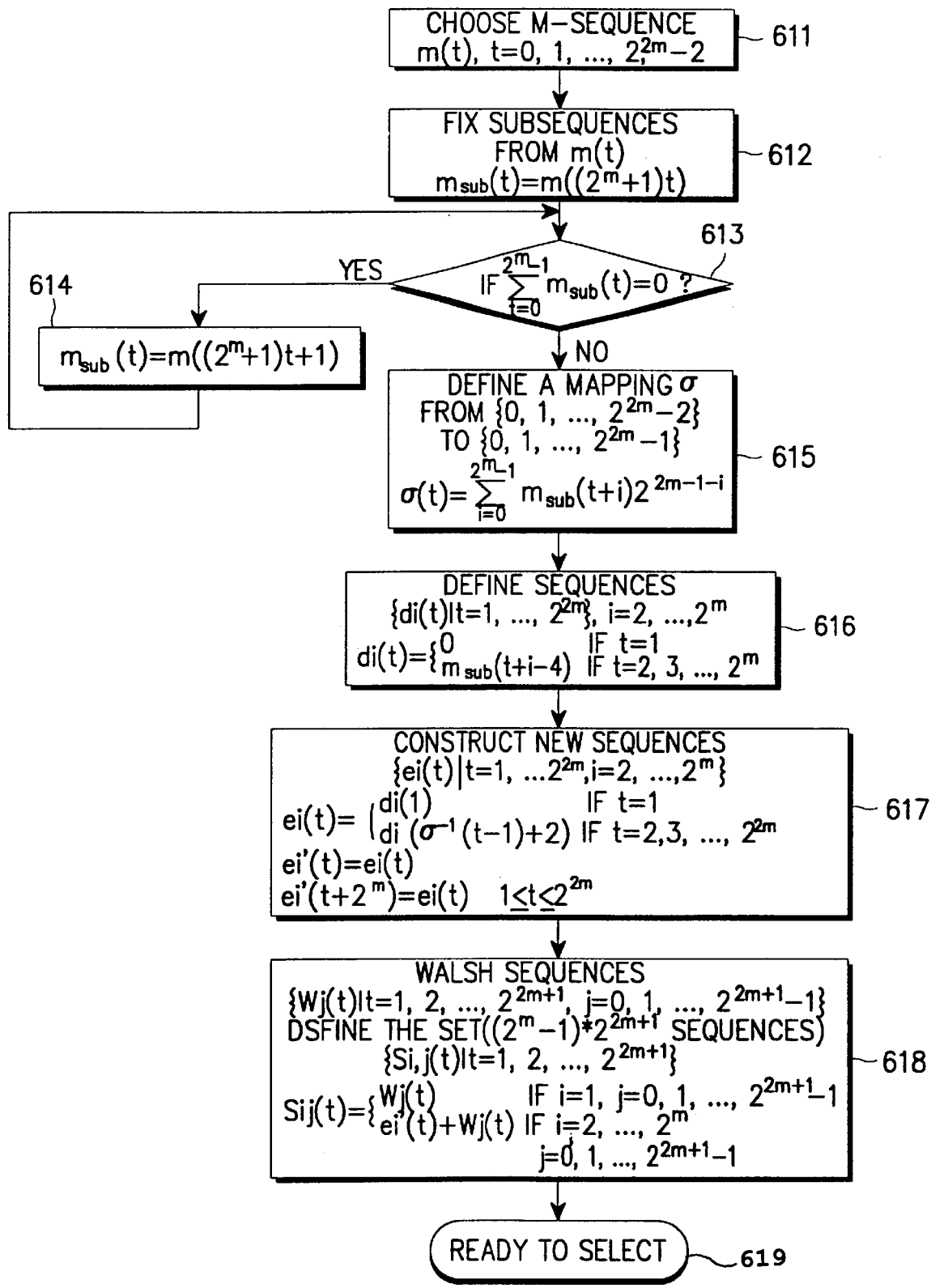
FIG. 6 is a flowchart which illustrates a method for generating quasi-orthogonal codes in accordance with another aspect of the present invention.

Referring now to FIG. 6, a flowchart illustrates a method for generating a quasi-orthogonal candidate sequence of length $2^{2m}+1$. In FIG. 6, steps 611 to 616 are similar to steps 511 to 516 discussed above for FIG. 5. After step 616, the newly generated sequences $e_i(t)$'s are repeated twice (step 617), thereby constructing the new sequences as follows.

$[e_i'(t)|t=1, \ldots, 2^{2m}, i=2, \ldots, 2^m]$ $e_i'(t)=e_i(t)$ $e_i'(t+2^{2m})=e_i(t)$ After being repeated twice, the sequences $e_i'(t)$ have the form as shown in Table 4 below, wherein the sequence $e_i'(t)$ has $2^m-1$ rows and $2^{2m-1}$ columns.

TABLE 4

| $e_i(t)$ | $e_i(t)$ |
|---|---|

Thereafter, the quasi-orthogonal codes are generated (step 618) by using the sequences $e_i(t)$'s generated in step 617, where the Walsh codes being the orthogonal codes are expressed by the following:

$[W_j(t)|t=1,2,\ldots,2^{2m+1}, j=0,1,\ldots 2^{2m+1}-1]$ $[S_{ij}(t)|t=1,2,\ldots,2^{2m+1}]$ $S_{ij}(t) = \begin{bmatrix} W_j(t), & \text{if } i=1, & j=0,1,\ldots,2^{2m+1}-1 \\ e_i'(t)+W_j(t), & \text{if } i=2,\ldots,2^m, & j=0,1,\ldots,2^{2m+1}-1 \end{bmatrix}$ Either all or none of the sequences of the quasi-orthogonal codes generated in accordance with the methods illustrated in FIGS. 5 and 6 have the orthogonal properties. Further, the number of the selected groups depends upon the selected m-sequence. Table 5 below shows the states mentioned above, and the selected sequences are what has been referred to herein as quasi-orthogonal codes.

TABLE 5

| 2m | Characteristic Polynomial | # of Quasi Orthogonal Sequences |
|---|---|---|
|  | 1100001 | 3*64 |
|  | 1100111 | 3*64 |
|  | 1110011 | 3*64 |
| 6 | 1000011 | 2*64 |
|  | 1101101 | 2*64 |
|  | 1011011 | 2*64 |
|  | 101001101 | 6*256 *** |
|  | 101011111 | 6*256 |
|  | 110001101 | 4*256 |
|  | 110000111 | 4*256 |
|  | 111110101 | 4*256 |
|  | 100011011 | 2*256 |
|  | 100101101 | 2*256 |
|  | 101100011 | 2*256 |

TABLE 5-continued

| 2m | Characteristic Polynomial | # of Quasi Orthogonal Sequences |
|---|---|---|
| 8 | 101100101 | 2*256 |
|  | 101101001 | 2*256 |
|  | 101110001 | 2*256 |
|  | 110101001 | 2*256 |
|  | 111000011 | 2*256 |
|  | 111100111 | 2*256 |
|  | 100101011 | 0 |
|  | 111001111 | 0 |

Here, $e_i'(t)$ represents the sequence of length $2^{2m+1}$ and $e_i(t)$ represents the sequence of length $2^{2m}$. Of course, $e_i'(t)$ can be made from a combination of multiple $e_i'(t)$'s. Although number of the possible combinations is $(2^m-1)*(2^m-1)$, the number of $e_i'(t)$'s is $(2^m-1)$ under all circumstances. For example, for length 512, the number of the quasi-orthogonal code sets is 6*512 when using a first m-sequence of 2m=8, as represented by *** in Table 5.

As described above, it is possible to increase the channel capacity by using quasi-orthogonal codes described herein when further orthogonal codes are needed in situations where Walsh codes are used. In such a case, a minimum interference with the Walsh codes occurs, thus providing a fixed correlation value. For example, when N=64, a correlation value between the quasi-orthogonal code and the Walsh code is 8 or −8. In addition, the partial correlation value between the quasi-orthogonal codes of length N=256 and the Walsh codes of length N=64 is also 8 or −8. This means that it is possible to determine an amount of the interference.

These quasi-orthogonal codes can be used in every CDMA system using Walsh codes. When a CDMA system utilizes the quasi-orthogonal codes together with the Walsh codes, the following three options can be taken into consideration:

Option 1

In a system providing service at a variable data rate by using the Walsh codes, it is possible to freely use the Walsh codes without restriction of the length, as well as use all the quasi-orthogonal code sequences as a total length.

Option 2

It is possible to construct two orthogonal sets by selecting one of a Walsh code group and a quasi-orthogonal code group, and enable the two groups to support the variable data rate.

Option 3

It is possible to use the Walsh code group and the quasi-orthogonal group as one group and enable the two groups to support the variable data rate. In this case, there may occur a random code property between the quasi-orthogonal code groups.

It is preferable to use the quasi-orthogonal codes according to the applications to be used, taking into consideration the three options mentioned above. That is, when using the Walsh codes only, a modulating side interchanges a pre-engaged orthogonal code number with a demodulating side. However, when using the orthogonal codes and the quasi-orthogonal codes, it is necessary that the modulating side interchanges the pre-engaged orthogonal code number and the group number (an index i of Q' matrix $e_i(t)$ of FIG. 4) with the demodulating side. In such a case, the orthogonal code group is called a group 0, and in this manner, the succeeding group numbers are defined again up to $2^m-1$.

Reference will now be made to a method for using the quasi-orthogonal code group for a system having the variable data rate such as the orthogonal code group. The elements of the quasi-orthogonal code group are represented by the sum of the Walsh code corresponding to a specific Walsh code number and a quasi-mask corresponding to a quasi-orthogonal group number. In this case, the quasi-orthogonal code group number represents which $e_i(t)$ is selected. A method for supporting the variable data rate in the quasi-orthogonal code group is to use the allocated orthogonal code number as the Walsh code group and then add the allocated $e_i(t)$ at intervals of length N.

Figure 7:
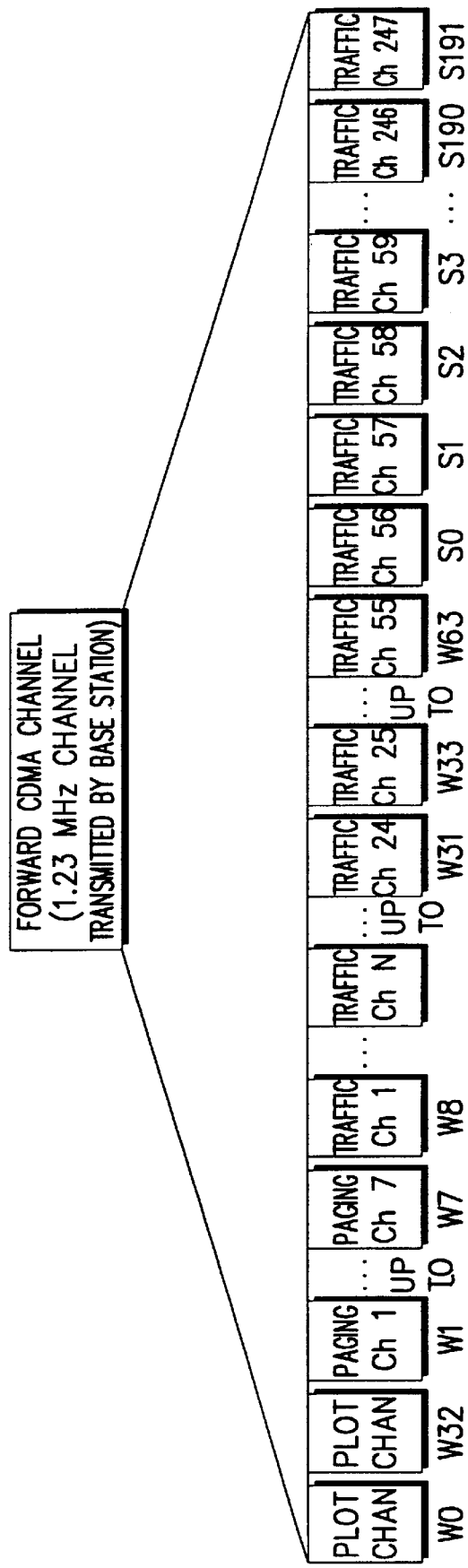
FIG. 7 is a diagram which illustrates channel expansion by using the quasi-orthogonal codes according to the present invention.

FIG. 7 shows a case where the channels are expanded by using the Walsh codes and the quasi-orthogonal codes in the IS-95/IS-95A forward link according to an embodiment of the present invention. In particular, the Walsh codes are represented by Wi (where i=0–63) and the channels are separated by the allocated orthogonal codes, respectively. The quasi-orthogonal codes are represented by Si (where i=0–191), and allocated to the traffic channels. As illustrated, the IS-95/IS-95A forward link can conduct the channel separation for 64 subscribers by using the Walsh codes, and additionally for 192 subscribers by using the quasi-orthogonal codes. Accordingly, it is to be appreciated the number of channels can be increased by a factor of 3 by using the Walsh codes together with the quasi-orthogonal codes.

Figure 8:
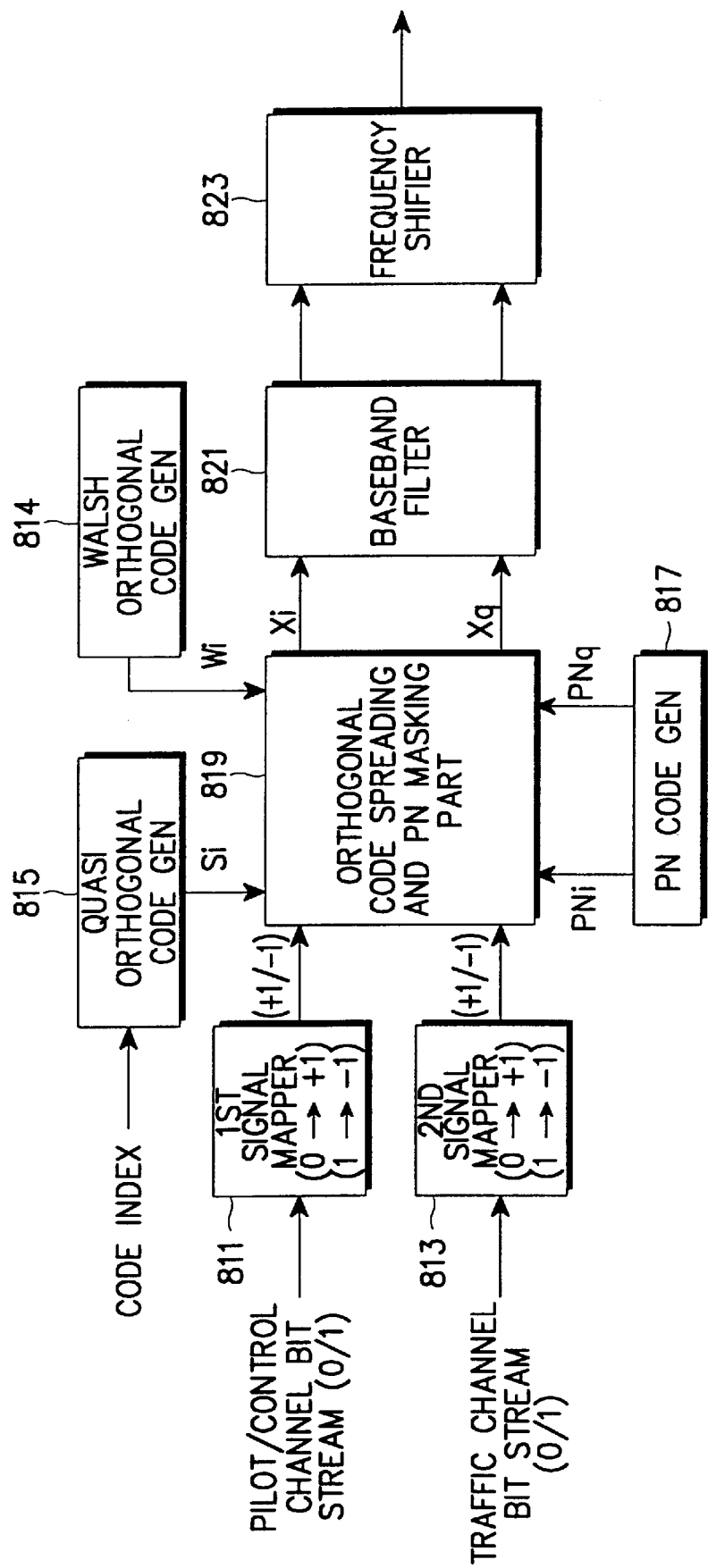
FIG. 8 is a block diagram of a mobile communication system using the quasi-orthogonal codes and the Walsh codes in accordance with one embodiment of the present invention.

FIG. 8 shows a block diagram of a mobile communication system having a spreader using the Walsh codes and the quasi-orthogonal codes according to an embodiment of the present invention. In the mobile communication system of FIG. 8, the channel transmitters include the pilot channel, the control channel and the traffic channel. The channel signals are independently separated by using the Walsh codes and the quasi-orthogonal codes.

Referring to FIG. 8, a first signal converter (or signal mapper) 811 converts input pilot and control channel data bit streams. Specifically, the first signal converter 811 converts an input bit stream 0 to a signal +1 and an input bit stream 1 to a signal -1, and then outputs the converted signals to an orthogonal code spreading and PN (Pseudo-Noise) masking part 819. A second signal converter 813 converts an input traffic channel data bit stream. Specifically, the second signal converter 813 converts an input bit stream 0 to a signal +1 and an input bit stream 1 to a signal -1, and then outputs the converted signals to the orthogonal code spreading and PN masking part 819. Here, when the communication device uses QPSK modulation, the first and second signal converters 811 and 813 demultiplex odd and even data, respectively.

A Walsh code generator 814 generates Walsh codes Wi in accordance with code indexes of the corresponding channels and outputs the generated Walsh codes Wi to the orthogonal code spreading and PN masking part 819. A quasi-orthogonal code generator 815, having the quasi-orthogonal codes, selects the quasi-orthogonal codes Si corresponding to the code index of the corresponding channel, and provides the selected quasi-orthogonal codes to the orthogonal code spreading and PN masking part 819. In other way, the quasi-orthogonal code generator 815. generates the quasi-orthogonal code mask, generates the quasi-orthogonal codes by adding the mask to the corresponding Walsh codes, and provides the generated quasi-orthogonal codes to the orthogonal code spreading and PN masking part 819. A PN code generator 817 generates a real PN code PNi and an imaginary PN code PNq, and applies the generated PN codes to the orthogonal code spreading and PN masking part 819. The orthogonal code spreading and PN masking part 819 spreads the signals output from the first and second signal converters 811 and 813 by first multiplying the output signals by the Walsh codes Wi and the quasi-orthogonal codes Si, and then PN-masking the spread signals by multiplying the spread signals so by the real and imaginary PN codes PNi and PNq, thereby generating output signals Xi and Xq. A baseband filter 821 baseband-filters the spread signals Xi and Xq output from the orthogonal code spreading and PN masking part 819. A frequency shifter 823 shifts the signals output from the baseband filter 821 to an RF (Radio Frequency) signal.

Assume that the pilot and control channels (which are reference channels) and the traffic channel are occupied by one user terminal of FIG. 8, in order to obtain a sync demodulation gain. In this situation, the user terminal transmits data bits of 1 or 0 through the traffic channel, and transmits reference data of 1 or 0 for sync-demodulating the traffic channel through the pilot and control channels. The data bits of 1 and 0 on the pilot and control channels and the traffic channel are converted respectively to the signals -1 and +1 by the first and second signal converters 811 and 813, and applied to the orthogonal code spreading and PN masking part 819. Then, the orthogonal code spreading and PN masking part 819 generates a complex spread signal in the baseband by multiplying the input signals by the corresponding Walsh or quasi-orthogonal codes, multiplies the orthogonally spread signals by the PN codes, and outputs the generated complex signals to the baseband filter 821. The complex spread signal is composed of the real component Xi and the imaginary component Xq. The baseband filter 821 then modulates and filters the complex signal by OQPSK (Offset Quadrature Phase Shift Keying) modulation, and the frequency shifter 823 shifts the output signal of the baseband filter 821 to the spread RF signal. The orthogonal code spreading and PN masking part 819 is a spreading part for enhancing the correlation property against the multipath delay, and can be realized in various structures.

Figure 9:
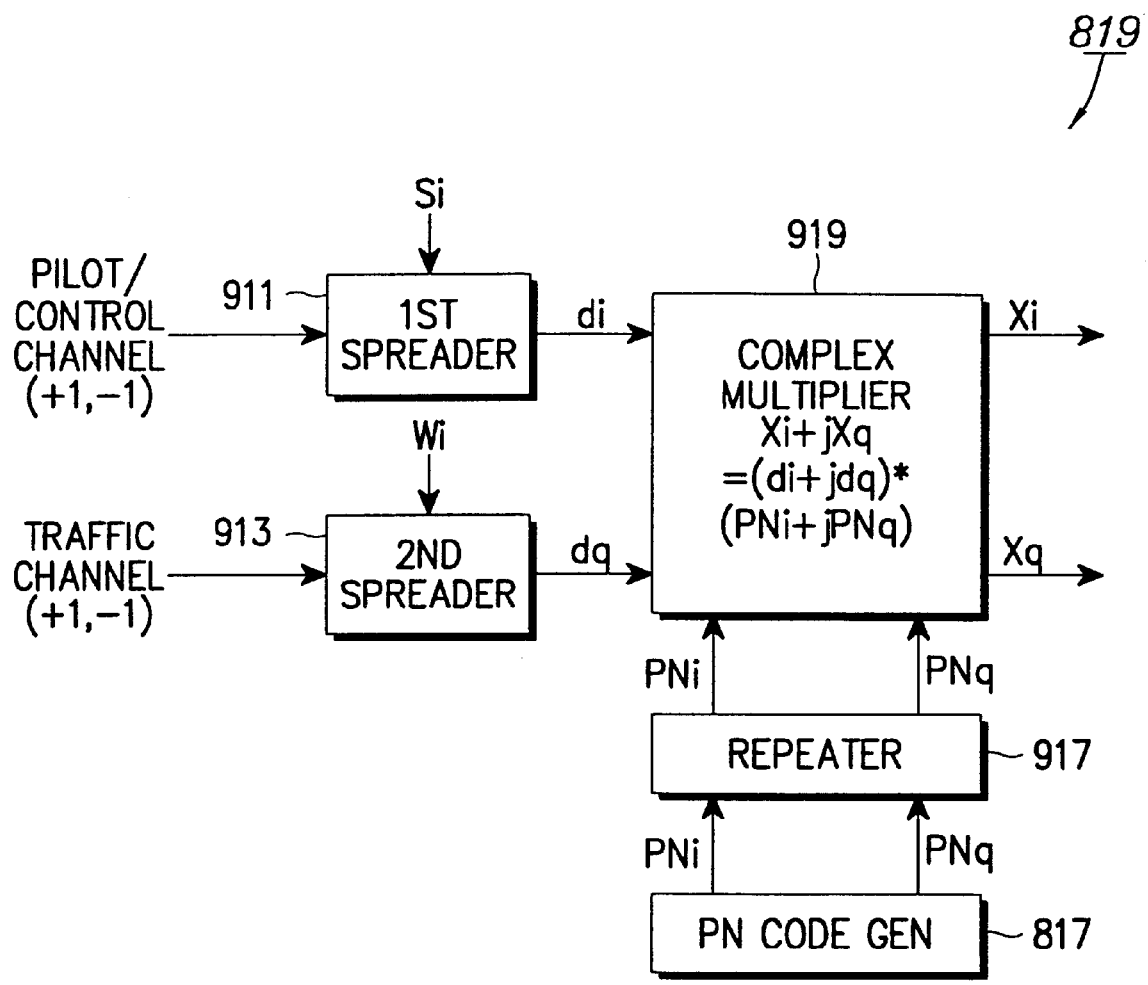
FIG. 9 is a block diagram of an orthogonal code spreading and PN masking unit of FIG. 8 using the quasi-orthogonal codes for the pilot and control channels and the Walsh codes for the traffic channels in accordance with one embodiment of the present invention.

FIG. 9 illustrates one embodiment of the structure of the orthogonal code spreading and PN masking part 819 which utilize the quasi-orthogonal codes Si for the pilot and control channels and the Walsh codes Wi for the traffic channel, and employs the complex PN-masking. A first spreader 911 multiplies the pilot and control channel signals by the quasi-orthogonal codes Si and outputs an orthogonally spread signal d1. A second spreader converter 913 multiplies the traffic channel signal by the Walsh codes Wi and outputs an orthogonally spread signal d2. A repeater 917 repeats the PN codes PNi and PNq output from a PN code generator 817, a predetermined number of times. A complex multiplier 919 multiplies the spread signals d1 and d2 output from the first and second spreaders 911 and 913, respectively, by the PN codes PNi and PNq output from the repeater 917, and generates PN-masked signals Xi and Xq (Xi=d1*(PNi+PNq), Xq=d2*(PNi*PNq)). As show in FIG. 9, the complex multiplier 919 performs complex PN masking through the complex operation.

In FIG. 9, the quasi-orthogonal codes Si allocated to the pilot and control channels and the Walsh codes Wi allocated to the traffic channel are sub-codes constituting the orthogonal codes and should be different from each other. Therefore, when the orthogonal code spreading and PN masking part 819 is constructed as shown in FIG. 9, it is possible to achieve the complete time synchronization between the pilot/control channels and the traffic channel, thereby reducing the mutual interference.

Figure 10:
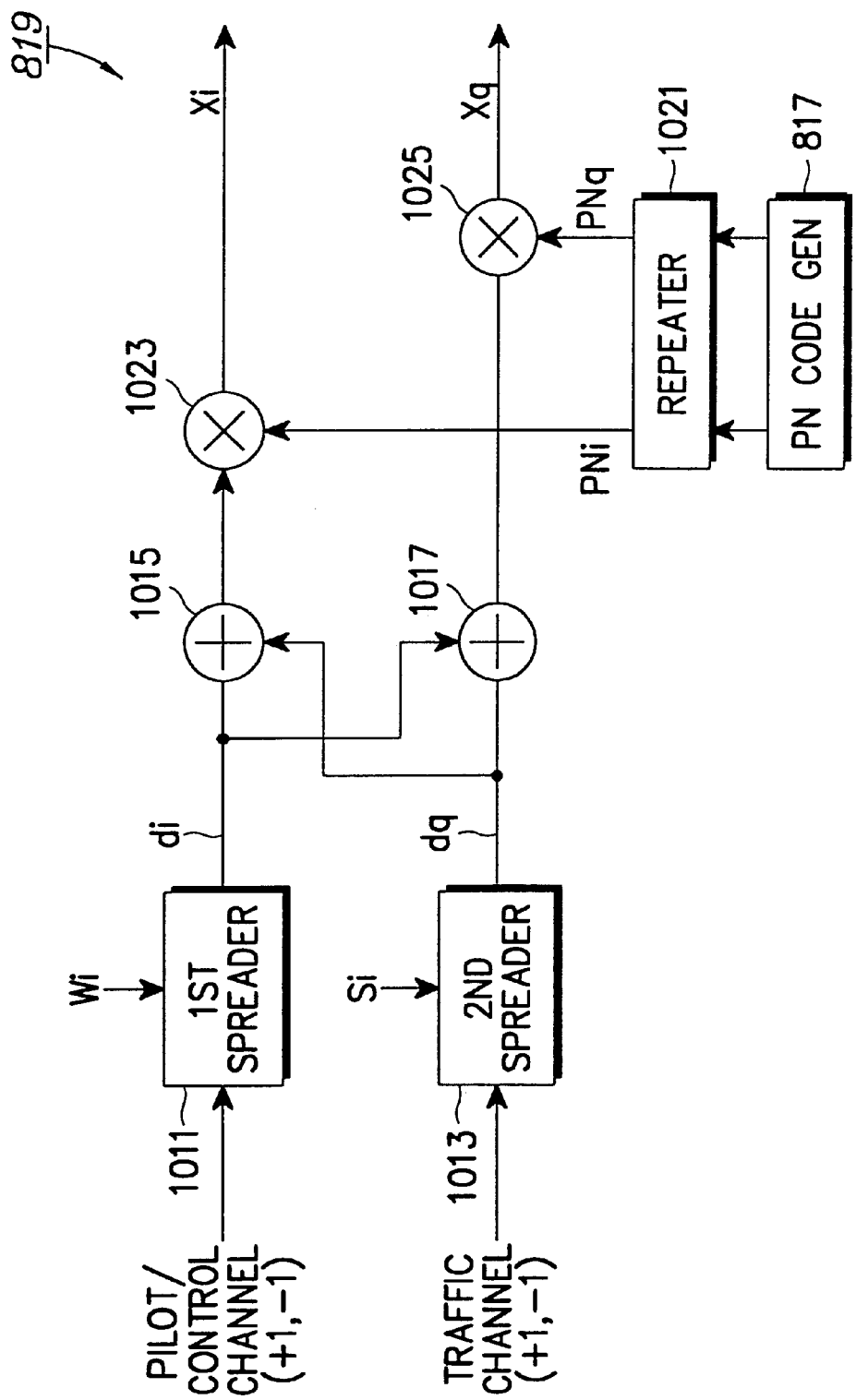
FIG. 10 is a block diagram of an orthogonal code spreading and PN masking unit using the Walsh codes for the pilot and control channels and the quasi-orthogonal codes for the traffic channels in accordance with one embodiment of the present invention.

FIG. 10 illustrates one embodiment of the orthogonal code spreading and PN masking part 819 which uses the Walsh codes Wi for the pilot and control channels and the quasi-orthogonal codes Si for the traffic channel, and which does not employ the complex PN masking. A first spreader 1011 multiplies pilot and control channel input signals by the Walsh codes Wi and outputs a spread signal d1. A second spreader 1013 multiplies the input traffic channel signal by the quasi-orthogonal codes Si and outputs a spread signal d2. An adder 1015 adds the spread signal d1 output from the first spreader 1011 to the spread signal d2 output from the second spreader 1013 to generate a signal d1+d2. An adder 1017 adds the spread signal d2 output from the second spreader 1013 to the spread signal d1 output from the first spreader 1011 to generate a signal d2+d1. A repeater 1021 repeats the real and imaginary PN codes PNi and PNq output from a PN code generator 817, a predetermined number of times. A multiplier 1023 multiplies the spread signal d1+d2 output from the adder 1015 by the PN code PNi output from the repeater 1021 and, generates a PN-masked signal Xi. A multiplier 1025 multiplies the spread signal d2+d1 output from the adder 1017 by the PN code PNq output from the repeater 1021 to generate a PN-masked signal Xq.

In FIG. 10, the Walsh codes allocated to the pilot and control channels should be different from the quasi-orthogonal codes Si allocated to the traffic channel. The orthogonal code spreading and PN masking part 819 constructed in this way can achieve complete time synchronization between the pilot/control channels and the traffic channel, thus reducing the mutual interference.

In summary, it is possible to expand channel capacity by using the Walsh codes together with the quasi-orthogonal codes as described above. As described above, the spreader illustrated in FIG. 9 uses the quasi-orthogonal codes for the pilot and control channels and the Walsh codes for the traffic channel. On the contrary, the spreader illustrated in FIG. 10 uses the Walsh codes for the pilot and control channels and the quasi-orthogonal codes for the traffic channel. Furthermore, it is possible to separately use Walsh codes for the pilot channel and quasi-orthogonal codes for the control channel, and vice versa. It is also possible to selectively use either of the Walsh codes and the quasi-orthogonal codes for the control channel, the pilot channel and the traffic channel.

While the present invention has been described in detail with reference to the specific embodiment of the present invention, it is a mere exemplary application. Thus, it is to be clearly understood that many variations can be made by anyone skilled in the art within the scope and spirit of the present invention.

What is claimed is:

1. A method for generating quasi-orthogonal codes of length $2^{2m}$ in a mobile communication system using Walsh codes and said quasi-orthogonal codes, comprising the steps of:

generating an m-sequence of length $2^{2m}$ where length $2^{2m}$ is determined for a variable m selected from the group of numbers (1, 2, 3, . . . ) and selecting sub-sequences having a period of $2^m-1$ by selecting elements at intervals of $2^{m+1}$;

generating a sequence of length $2^{2m}$ by adding "0" at the first position of the sequence of length $2^{2m}-1$;

generating $2^{m-1}$ sequences by connecting said sub-sequences, and column-permuting said generated sequences by a column permutation function;

adding said Walsh codes to said column-permuted sequences to generate quasi-orthogonal candidate sequences having a full correlation value between said Walsh codes and other quasi-orthogonal codes that is smaller than a lowest full correlation value threshold; and selecting, from said quasi-orthogonal candidate sequences, quasi-orthogonal codes having a partial correlation value with said Walsh codes that satisfies said partial correlation value at a variable data rate.

2. A channel transmission device for a CDMA (Code Division Multiple Access) mobile communication system, comprising:

a first spreader for spreading an input channel signal with a quasi-orthogonal code;

a second spreader for spreading another input channel signal with a Walsh code; and a PN (Pseudo-Noise) spreader for complex-spreading signals output from said first and second spreaders with a PN sequence wherein the quasi-orthogonal code is characterized in that a partial correlation between the quasi-orthogonal code and the Walsh code satisfies a first condition represented as $$\left| \sum_{t=1+(\frac{N}{M}l)}^{\frac{N}{M}(l+1)} (-1)^{S_i(t)+W_k(t)} \right| \le \theta_{\frac{N}{M}\min}$$

where l=0,1,2, . . . , M−1, $S_i(t)$ represents the quasi-orthogonal code, $W_k(t)$ represents the Walsh Code, N equals a length of the Walsh code, M is a variable depending on a change of a data rate, and $$\theta_{\frac{N}{M}\min}$$

represents a lowest partial correlation value threshold.

3. The channel transmission device as claimed in claim 2, wherein said lowest partial correlation value threshold is 4 when the N=256 and the M=16.

4. The channel transmission device as claimed in claim 2, wherein said lowest partial correlation value threshold is 4 when the N=256 and the M=32.

5. The channel transmission device as claimed in claim 2, wherein the quasi-orthogonal code is characterized in that a full correlation value with said Walsh code satisfies a second condition represented by:

$$\left| \sum_{t=1}^{N} (-1)^{S_i(t)+W_k(t)} \right| \le \theta_{N\min}$$

and a full correlation value with an other quasi-orthogonal codes satisfies a third condition represented by:

$$\left| \sum_{t=1}^{N} (-1)^{S_i(t)+S'_i(t)} \right| \le \theta_{N\min}$$

where $S_i(t)$ represents the quasi-orthogonal codes, $W_k(t)$ represents the Walsh Code, N equals a length of the Walsh codes, $\theta_{Nmim}$ represents the lowest full correlation value threshold, and $S'_i(t)$ represents said other quasi-orthogonal codes.

6. The channel transmission device as claimed in claim 5, wherein the lowest full correlation value threshold is 16 when the N=256.

7. The base station system as claimed in claim 2, wherein a specified part of the quasi-orthogonal code is used when a data rate of the input channel signal is varied.

8. A channel transmission method for a CDMA mobile communication system, comprising the steps of:

spreading an input channel signal with quasi-orthogonal code;

spreading another input channel signal with Walsh code; and complex-spreading said spread signals with a PN (Pseudo-Noise) sequence wherein the quasi-orthogonal code is characterized in that a partial correlation value with said Walsh code does not exceed a lowest partial correlation value threshold and the partial correlation value between the quasi-orthogonal code and the Walsh code satisfies a first condition represented as:

$$\left| \sum_{t=1+\left(\frac{N}{M}l\right)}^{\frac{N}{M}(l+1)} (-1)^{S_i(t)+W_k(t)} \right| \leq \theta_{\frac{N}{M}\min}$$

where $1 \leq i \leq N$, $1 \leq k \leq N$, $1 \leq t \leq N$, $l=0,1,2,\ldots,M-1$, $S_i(t)$ represents the quasi-orthogonal code, $W_k(t)$ represents the Walsh Code, N equals a length of the Walsh codes, M is a variable depending on a change of a data rate, and $$\theta_{\frac{N}{M}\min}$$

represents said lowest partial correlation value threshold.

9. The channel transmission device as claimed in claim 8, wherein said lowest partial correlation value threshold is 4 when the N=256 and the M=16.

10. The channel transmission device as claimed in claim 8, wherein said lowest partial correlation value threshold is 4 when the N=256 and the M=32.

11. The channel transmission method as claimed in claim 8, wherein the quasi-orthogonal code is characterized in that a full correlation value with said Walsh code satisfies a second condition represented by;

$$\left| \sum_{t=1}^{N} (-1)^{S_i(t)+W_k(t)} \right| \leq \theta_{N\min}$$

and a full correlation value with other quasi-orthogonal codes satisfies a third condition represented by;

$$\left| \sum_{t=1}^{N} (-1)^{S_i(t)+S'_i(t)} \right| \leq \theta_{N\min}$$

where $S_i(t)$ represents the quasi-orthogonal code, $W_k(t)$ represents the Walsh Code, N equals a length of the Walsh code, $\theta_{Nmim}$ represents the lowest full correlation value threshold, and $S'_i(t)$ represents said other quasi-orthogonal codes.

12. The channel transmission device as claimed in claim 11, wherein the lowest full correlation value threshold is 16 when the N=256.

13. The channel transmission method as claimed in claim 8, wherein a specified part of the quasi-orthogonal code is used when a data rate of the input channel signal is varied.

14. A method for generating quasi-orthogonal codes of length $2^{2m}$ in a mobile communication system using Walsh codes and said quasi-orthogonal codes, comprising the steps of:

generating an m-sequence of length $2^{2m}-1$ where length $2^{2m}-1$ is determined for variable m selected from the group of numbers (1, 2, 3 . . . ) and making sub-sequences having a period of $2^m-1$ by selecting elements out of the m-sequence elements at intervals of $2^m+1$;

generating a sequence of length $2^{2m}-1$ by connecting said sub-sequences;

generating a sequence of length $2^{2m}$ by adding 0 at the first position of the sequence of length $2^{2m}-1$;

column-permuting said sequence of length $2^{2m}$ by applying a column permutation function which makes a sequence of length $2^{2m}$ generated by adding 0 at the first position of the m-sequence to a Walsh code;

adding the column-permuted sequence to each of the length $2^{2m}$ Walsh codes to generate quasi-orthogonal candidate sequences of which full correlation value between the Walsh codes and the quasi-orthogonal candidate sequences is smaller than a lowest full correlation value threshold; and selecting, from said quasi-orthogonal candidate sequences, quasi-orthogonal codes whose partial correlation value with said Walsh codes does not exceed a lowest partial correlation value threshold.

15. The method as claimed in claim 14, further comprising the step of twice repeating said quasi-orthogonal codes to generate quasi-orthogonal codes having a length $2^{2m+1}$.

16. A method for generating quasi-orthogonal codes of length N in a mobile communication system using Walsh codes and said quasi-orthogonal codes comprising the steps of:

providing a plurality of conditions; and generating said quasi-orthogonal codes in accordance with said conditions; said conditions being that a full correlation between a k-th Walsh code Wk(t) ($1 \leq k \leq N$, $1 \leq t \leq N$) and an i-th quasi-orthogonal code Si(t) ($1 \leq i \leq N$, $1 \leq t \leq N$) does not exceed $\theta_{Nmin}$ as shown in Equation (5), that a full correlation between an i-th line and an i'-th line of the quasi-orthogonal codes does not exceed $\theta_{Nmin}$ as shown in Equation (6), and that when using the quasi-orthogonal codes of length N and the Walsh codes of length N/M, a partial correlation between the respective codes of length N/M does not exceed $$\theta_{\frac{N}{M}\min}$$

as shown in Equation (7):

$$\left| \sum_{t=1}^{N} (-1)^{S_i(t)+W_k(t)} \right| \leq \theta_{N\min} \quad (5)$$

$$\left| \sum_{t=1}^{N} (-1)^{S_i(t)+S'_i(t)} \right| \leq \theta_{N\min} \quad (6)$$

-continued $$\left| \sum_{t=1+(\frac{N}{M}l)}^{\frac{N}{M}(l+1)} (-1)^{S_i(t)+W_k(t)} \right| \le \theta_{\frac{N}{M}\min} \quad (7)$$

where, l=0,1,2, ..., M−1, $W_k(t)$ represents a k-th orthogonal code of length N (1≦k≦N), $S'_i(t)$ represents other quasi-orthogonal codes, and $S_i(t)$ represents a quasi-orthogonal code of length N (1≦i≦X), where X is a quasi-orthogonal code number selected so that $S_i(t)$ satisfies Equations (5) to (7).

17. A base station system for a CDMA (Code Division Multiple Access) mobile communication system, comprising:
  a first spreader for spreading an input channel signal with a quasi-orthogonal code;
  a second spreader for spreading another input channel signal with a Walsh code;
  a PN (Pseudo-Noise) spreader for complex-spreading signals output from said first and second spreaders with a PN sequence;
  a baseband filter for filtering the complex spread signal; and
  a frequency shifter for shifting the filtered signal to a RF (Radio Frequency) signal;
  wherein the quasi-orthogonal code is characterized in that a partial correlation between the quasi-orthogonal code and the Walsh code satisfies a first condition represented as:

$$\left| \sum_{t=1+(\frac{N}{M}l)}^{\frac{N}{M}(l+1)} (-1)^{S_i(t)+W_k(t)} \right| \le \theta_{\frac{N}{M}\min}$$

a full correlation value between said Walsh codes and said quasi-orthogonal code satisfies a second condition represented by:

$$\left| \sum_{t=1}^{N} (-1)^{S_i(t)+W_k(t)} \right| \le \theta_{N\min}$$

and a full correlation value with an other quasi-orthogonal codes satisfies a third condition represented by:

$$\left| \sum_{t=1}^{N} (-1)^{S_i(t)+S'_i(t)} \right| \le \theta_{N\min}$$

where l=0,1,2, ..., M−1, 1≦i≦N, 1≦k≦N, $S_i(t)$ represents the quasi-orthogonal code, $W_k(t)$ represents the Walsh Code, N equals a length of the Walsh code, M is a variable depending on a change of a data rate, $$\theta_{\frac{N}{M}\min}$$

represents a lowest partial correlation value threshold, $\theta_{Nmin}$ represents a lowest full correlation value threshold, and $S'_i(t)$ represents said other quasi-orthogonal codes.

18. The base station system as claimed in claim 17, wherein said quasi-orthogonal code is characterized in that a partial correlation value between said Walsh code and said quasi-orthogonal code does not exceed a lowest partial correlation value threshold 4 when the length of Walsh code is 16 and the length of quasi-orthogonal code is 256.

19. The base station system as claimed in claim 17, wherein said lowest partial correlation value threshold is 4 when the N=256 and the M=32.

20. The base station system as claimed in claim 17, wherein said quasi-orthogonal codes are characterized in that a full correlation value between said Walsh codes and the quasi-orthogonal codes does not exceed a lowest full correlation value threshold 16 when a code length of the Walsh codes and he quasi-orthogonal codes is 256.

21. A channel signal transmission method for a CDMA mobile communication system, comprising the steps of:
  spreading an input signal with a quasi-orthogonal code;
  spreading another input signal with a Walsh code;
  complex spreading said spread signals with a PN (Pseudo Noise) sequence;
  filtering the complex-spread signal; and
  shifting the filtered signal to a RF (Radio Frequency) frequency;
  wherein, the quasi-orthogonal code is characterized in that a partial correlation between the quasi-orthogonal code and the Walsh code satisfies a first condition represented as:

$$\left| \sum_{t=1+(\frac{N}{M}l)}^{\frac{N}{M}(l+1)} (-1)^{S_i(t)+W_k(t)} \right| \le \theta_{\frac{N}{M}\min}$$

a full correlation value between said Walsh codes and said quasi-orthogonal code satisfies a second condition represented by:

$$\left| \sum_{t=1}^{N} (-1)^{S_i(t)+W_k(t)} \right| \le \theta_{N\min}$$

and a full correlation value with an other quasi-orthogonal codes satisfies a third condition represented by:

$$\left| \sum_{t=1}^{N} (-1)^{S_i(t)+S'_i(t)} \right| \le \theta_{N\min}$$

where l=0,1,2, ..., M−1, 1≦i≦N, 1≦k≦N, $S_i(t)$ represents the quasi-orthogonal code, $W_k(t)$ represents the Walsh Code, N equals a length of the Walsh code, M is a variable depending on a change of a data rate, $$\theta_{\frac{N}{M}\min}$$

represents the lowest partial correlation value threshold, $\theta_{Nmin}$ represents the lowest full correlation value threshold, and $S'_i(t)$ represents said other quasi-orthogonal codes.

22. The channel signal transmission method as claimed in claim 21, wherein said quasi-orthogonal code is characterized in that a partial correlation value between said Walsh code and said quasi-orthogonal code does not exceed a lowest partial correlation value threshold 4 when the length of Walsh code is 16 and the length of quasi-orthogonal code is 256.

23. The channel signal transmission method as claimed in claim 21, wherein the lowest partial correlation value threshold $$\theta_{\frac{N}{M}\min}$$

is determined by $(N/M)^{1/2}$.

24. The channel signal transmission method as claimed in claim 23, wherein said lowest partial correlation value threshold is 4 when the N=256 and the M=16.

25. The channel signal transmission method as claimed in claim 23, wherein said quasi-orthogonal codes are characterized in that a full correlation value between said Walsh codes and said quasi-orthogonal codes does not exceed a lowest full correlation value threshold and a full correlation value between said quasi-orthogonal codes does not exceed the lowest full correlation value threshold 16 when the length of the Walsh codes and the quasi-orthogonal code is 256.

* * * * *